United States Patent
Greenberger et al.

(10) Patent No.: US 10,423,304 B2
(45) Date of Patent: Sep. 24, 2019

(54) DYNAMIC WEB ACTIONS PALETTE

(71) Applicant: International Business Machines Corporation, Armonk, NY (US)

(72) Inventors: Jeremy A. Greenberger, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 15/367,270

(22) Filed: Dec. 2, 2016

(65) Prior Publication Data

US 2018/0157380 A1  Jun. 7, 2018

(51) Int. Cl.
| | |
|---|---|
| H04L 12/58 | (2006.01) |
| G06F 3/0482 | (2013.01) |
| G06F 17/22 | (2006.01) |
| G06F 16/957 | (2019.01) |
| G06F 9/451 | (2018.01) |

(52) U.S. Cl.
CPC ............ G06F 3/0482 (2013.01); G06F 9/453 (2018.02); G06F 16/957 (2019.01); G06F 17/2247 (2013.01); H04L 51/04 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,707,226 B1* | 4/2010 | Tonse | ............... | G06Q 30/02 707/796 |
| 8,078,677 B2* | 12/2011 | Mendiola | ............... | H04L 63/104 707/781 |
| 8,615,718 B2 | 12/2013 | Landman et al. | | |
| 9,076,154 B1* | 7/2015 | Song | ............... | G06Q 30/02 |
| 9,086,896 B2 | 7/2015 | Smith et al. | | |
| 9,183,316 B2 | 11/2015 | Van Den Driessche | | |
| 9,361,638 B2 | 6/2016 | Isaacson et al. | | |
| 9,417,765 B1* | 8/2016 | Lewis | ............... | G06F 3/0482 |
| 9,699,122 B2* | 7/2017 | Appelman | ............... | H04L 51/046 |

(Continued)

OTHER PUBLICATIONS

Dix et al.; "From the Web of Data to a World of Action," Web Semantics; Science, Services, and Agents on the WWW, 2010.

(Continued)

*Primary Examiner* — Hien L Duong
(74) *Attorney, Agent, or Firm* — Steven M. Greenberg, Esq.; Shutts & Bowen LLP

(57) ABSTRACT

Embodiments of the invention include a method, system and computer program product for a dynamic Web actions palette. In an embodiment of the invention, a method of dynamically configuring a Web actions palette includes loading text from a message received in a communications program executing in memory of a computer and identifying in the text, a suggestion to perform an action in connection with a Web site remote from the computer. The method also includes generating a network request to perform the action in the Web site and configuring a button to transmit the generated network request and updating a palette of one or more buttons with the configured button for display in the computer. Finally, the method includes displaying the palette in the computer and repeating the loading, identifying, generating, configuring and displaying for additional messages received in the communications program.

18 Claims, 2 Drawing Sheets

(56) References Cited

U.S. PATENT DOCUMENTS

| | | | |
|---|---|---|---|
| 2003/0233419 A1* | 12/2003 | Beringer | G06Q 10/107 709/206 |
| 2008/0147501 A1* | 6/2008 | Gilliam | G06Q 10/107 705/14.66 |
| 2009/0177754 A1* | 7/2009 | Brezina | G06Q 10/107 709/206 |
| 2009/0259971 A1 | 10/2009 | Rankine et al. | |
| 2013/0067039 A1* | 3/2013 | Hartzler | G06Q 10/10 709/219 |
| 2013/0275429 A1* | 10/2013 | York | G06F 17/30029 707/737 |
| 2014/0019979 A1 | 1/2014 | Amershi et al. | |
| 2014/0067977 A1 | 3/2014 | Rasmussen et al. | |
| 2014/0136990 A1* | 5/2014 | Gonnen | H04L 51/18 715/752 |
| 2014/0172986 A1* | 6/2014 | Kumar | G06Q 10/107 709/206 |
| 2015/0273344 A1 | 10/2015 | Kruglick | |
| 2015/0334075 A1 | 11/2015 | Wang et al. | |
| 2016/0080820 A1 | 3/2016 | Lee et al. | |
| 2016/0098701 A1 | 4/2016 | Harris | |
| 2016/0117670 A1 | 4/2016 | Davis | |
| 2016/0124636 A1* | 5/2016 | Valade | G06F 3/04886 715/773 |
| 2016/0292284 A1* | 10/2016 | Moxon | G06F 16/24578 |
| 2017/0068579 A1* | 3/2017 | Franklin | G06F 9/466 |
| 2017/0116339 A1* | 4/2017 | Stein | G06F 16/9535 |
| 2017/0149703 A1* | 5/2017 | Willett | H04W 4/12 |
| 2017/0250930 A1* | 8/2017 | Ben-Itzhak | H04L 51/02 |
| 2017/0293937 A1* | 10/2017 | Gilliam | G06Q 30/0277 |
| 2017/0300466 A1* | 10/2017 | Campbell | G06F 17/246 |
| 2018/0053224 A1* | 2/2018 | McClave | G06Q 50/01 |
| 2018/0129995 A1* | 5/2018 | Fowler | G06Q 10/06311 |

OTHER PUBLICATIONS

IP.com et al.; "Collaboratively Defined Web Conference Actions", Nov. 15, 2011.

IP.com et al.; "A Visual Method for Capturing and Applying Actionable Templates to Customize Portal Applications," May 3, 2005.

* cited by examiner

DYNAMIC WEB ACTIONS PALETTE

BACKGROUND OF THE INVENTION

Field of the Invention

The present invention relates to user interface automation and more particularly to user interface shortcuts and icons.

Description of the Related Art

The user interface is the visual interface between program logic and an end user in connection with a computer program. Generally, in a user interface an end user selects a user interface control such as a button in order to activate the button in response to which the program logic of a corresponding program. A well, within the user interface, information is presented to the end user by the program logic. However, much of the role of the user interface is to respond to end user input and to present the outcome of the user input by the program logic.

The user interface in respect to an operating system often provides a portion through which shortcut actions may be invoked through an aggregation of different buttons in a configuration often referred to as a palette or icon bar or button bar. Generally, in most instances, the button bar must be manually configured so that each button refers specifically to a particular operation of the operating system, or a particular computer program executing with the assistance of the operating system. In some instances, the button bar is pre-configured in a manner deemed most suitable by the software publisher.

A Web actions palette may be viewed as a special case of a button bar in which each button in the button bar is configured to invoke a resource request for a particular resource in connection with a Web site. A typical Web actions palette itself may be formed as a user interface control defined with the markup of a Web page allowing quick access by the end user to one or more other Web pages of one or more other different Web sites, or mobile applications providing an interface to the one or more other different Web sites. Indeed, the Web actions palette has found wide application in promoting the "sharing" of Web content on a Web page onto the profile pages of different social media Web sites.

BRIEF SUMMARY OF THE INVENTION

Embodiments of the present invention address deficiencies of the art in respect to button bars and provide a novel and non-obvious method, system and computer program product for a dynamic Web actions palette. In an embodiment of the invention, a method of dynamically configuring a Web actions palette includes loading text from a message received in a communications program executing in memory of a computer and identifying in the text, a suggestion to perform an action in connection with a Web site remote from the computer. The method also includes generating a network request to perform the action in the Web site and configuring a button to transmit the generated network request and updating a palette of one or more buttons with the configured button for display in the computer. Finally, the method includes displaying the palette in the computer and repeating the loading, identifying, generating, configuring and displaying for additional messages received in the communications program.

In one aspect of the embodiment, the network request is a uniform resource locator pointing to a page and invoking an action of a social media Web site. In another aspect of the embodiment, the method additionally includes filtering the palette to remove an existing button in response to the configuring of the button to transmit the generated network request. As well, the method additionally includes sorting the palette to re-order buttons in the palette in response to the configuring of the button to transmit the generated network request. In yet another aspect of the embodiment, the palette is displayed in a newly composed message in the communications program. In even yet another aspect of the embodiment, the Web site is a social media Web site and the action is an action to establish a connection in the social media Web site.

In another embodiment of the invention, a data processing system is configured for dynamically configuring a Web actions palette. The system includes a mobile computing device comprising memory and a processor and a communications program executing in the memory of the mobile computing device. The system also includes a Web actions palette module executing in the memory of the mobile computing device. The module includes program code enabled upon execution in the memory of the mobile computing device to load text from a message received in the communications program, identify in the text, a suggestion to perform an action in connection with a Web site remote from the mobile computing device, generate a network request to perform the action in the Web site, configure a button to transmit the generated network request and update a palette of one or more buttons with the configured button for display in the mobile computing device, display the palette in the mobile computing device, and repeat the loading, identifying, generating, configuring and displaying for additional messages received in the communications program.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamically configuring a Web actions palette. In accordance with an embodiment of the invention, communications received in a client application of a computer are parsed to identify a suggested action in connection with a Web site remote from the computer. The identified suggested action is correlated to a specific network request for a specific operation exposed by a user interface to the Web site and a button in a Web actions palette is configured with the specific network request. Optionally, the different buttons of the palette are then sorted, filtered or both so as to present different ones of the buttons in a desired order and to remove from the palette specific ones of the buttons so as to accommodate the configured button to the extent that the configured button is newly added to the palette. The process then repeats ad additional suggested actions are identified in the same or different communications.

Figure 1:
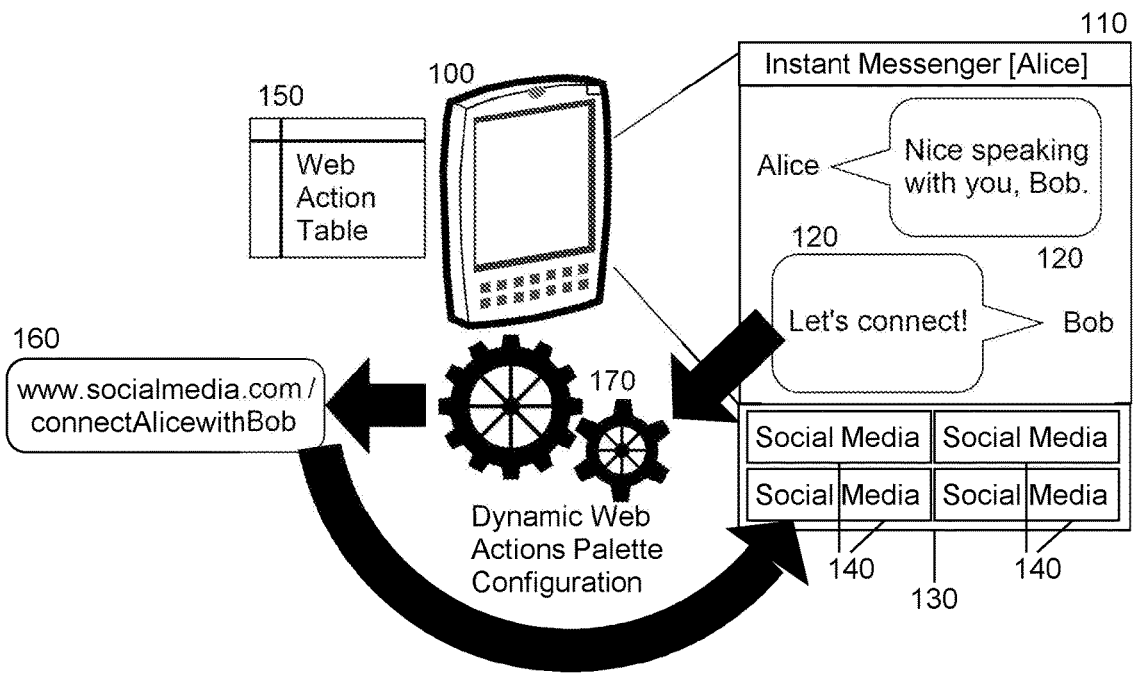
FIG. 1 is a pictorial illustration of a process for dynamically configuring a Web actions palette.

In further illustration, FIG. 1 pictorially shows a process for dynamically configuring a Web actions palette. As shown in FIG. 1, different messages 120 are received in a communications client 110 of a computing device 100. Dynamic Web actions palette configuration logic 170 parses the content of the messages 120 to identify a suggested action with respect to a social media Web site remote from the computing device 100. The configuration logic 170 then locates in a Web action table 150 a corresponding Web action for the identified suggestion. Using the located Web action, the configuration logic 170 generates a network request 160 such as a uniform resource locator (URL) that performs the located Web action in connection with the end user of the computing device 100 and the individual exchanging the messages 120 with the end user.

Finally, the configuration logic 170 configures a button 140 in a Web actions palette 130 to cause upon the activation of the configured one of the buttons 140, the transmission by the computing device 100 of the network request 160. Optionally, the configuration logic 170 filters the Web actions palette 130 to remove a least relevant one of the buttons 140 in favor of a newly added one of the buttons that includes the configured one of the buttons 140. Least relevant may be determined, for instance as a least recently used one of the buttons 140 or a least frequently used one of the buttons 140. As another alternative, the configuration logic 170 may sort the Web actions palette 130 in consideration of the relevance of each of the buttons 140.

Figure 2:
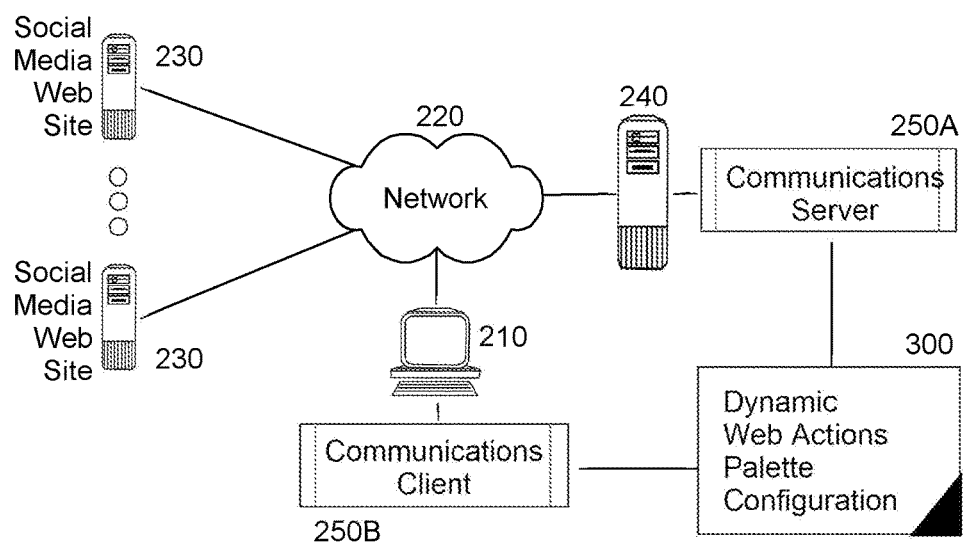
FIG. 2 is a schematic illustration of a data processing system configured for dynamically configuring a Web actions palette; and, FIG. 3 is a flow chart illustrating a process for dynamically configuring a Web actions palette.

The process described in connection with FIG. 1 may be implemented in a data processing system. In further illustration, FIG. 2 schematically shows a data processing system configured for dynamically configuring a Web actions palette. The system includes a host computing platform 210 that includes one or more computers each with memory and at least one processor. The host computing platform 210 may include a personal computer or a mobile computing device such as a tablet computer or a smartphone, to name two examples. The host computing platform 210 is communicatively coupled to a communications server 240 and the host computing platform 210 hosts the execution of a communications client 250B such as an e-mail client, instant messenger or text messenger, that communicates over computer communications network 220 with a communications server 250A operating in the communications server 240.

Notably, a dynamic Web actions palette configuration module 300 is coupled to either the communications client 250B, the communications server 250A or both. The dynamic Web actions palette configuration module 300 includes program code that when executing by a processor of a computer, is enabled to process a message exchanged between the communications client 250B and the communications server 250A to identify a suggested action. The identification of the suggested action can occur based upon a keyword analysis of the parsed text of the message, or by the natural language processing of the message. In response to identifying the suggestion, the dynamic Web actions palette configuration module 300 determines a specific action to be performed in connection with one of a multiplicity of social media Web sites 230 communicatively linked to the host computing platform 210.

More particularly, the dynamic Web actions palette configuration module 300 can look up an associated action for a specific one of the social media Web sites 230 and upon determining an action associated with the identified suggestion, the dynamic Web actions palette configuration module 300 generates a network request to the specific one of the social media Web sites 230. Thereafter, the dynamic Web actions palette configuration module 300 configures a button in a Web actions palette to transmit the generated network request in response to an activation of the configured button. Finally, as an option, the dynamic Web actions palette configuration module 300 sorts the buttons of the Web actions palette, filters the buttons of the Web actions palette or both. Alternatively, the dynamic Web actions palette configuration module 300 inserts the configured button in a message in the communications client 250B.

Figure 3:
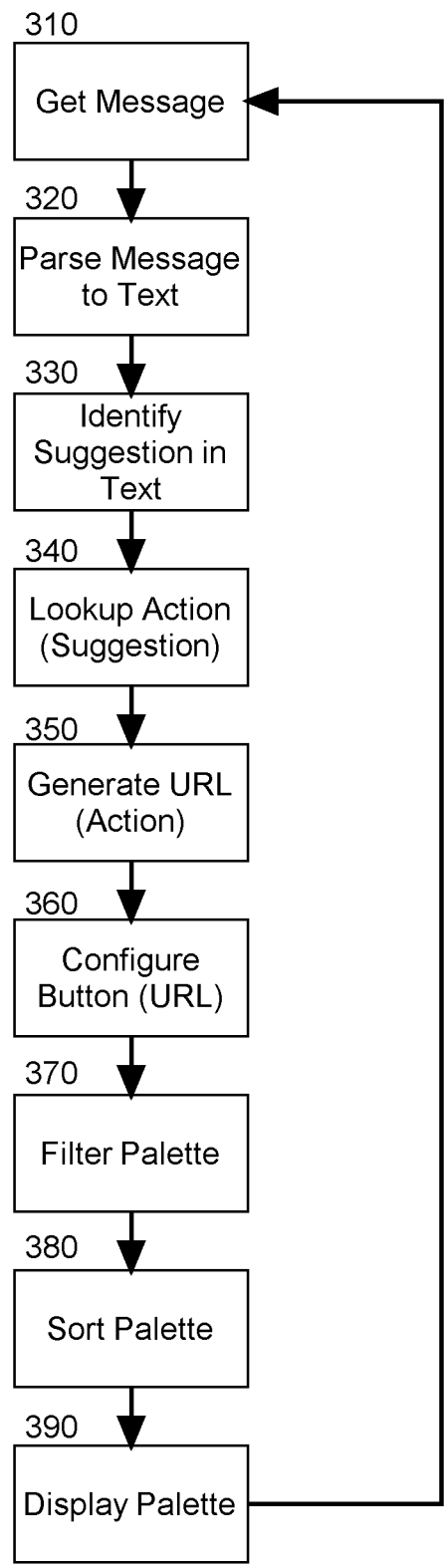

In yet further illustration of the operation of the dynamic Web actions palette configuration module 300, FIG. 3 is a flow chart illustrating a process for dynamically configuring a Web actions palette. The process begins in block 310 with the receipt of a message in a communications client of a mobile device. In block 320, the message is parsed into text and in block 330, a suggestion is identified in the text. In block 340, an action corresponding to the identified suggestion is determined, for instance in reference to a table of suggestions to actions. The table of actions itself may be manually created or "learned" in that the utilization of a particular social media Web site in temporal proximity to the receipt of a suggestion identified in text can be noted in the table after one or more observed instances of the utilization of the particular social media Web site in temporal proximity to the receipt of the suggestion identified in the text. Thereafter, in block 350 a network request, for example a URL directed to a particular one of the social media Web sites associated with the suggestion, is generated for the action and customized to account for the identity of the end users exchanging the message.

In block 360, a button in a Web actions palette is configured. For instance, a new button is created to trigger the transmission of the network request to the social media Web site responsive to an activation of the new button. Alternatively, an existing button in the Web actions palette is configured to trigger the transmission of the network request to the social media Web site responsive to an activation of the re-configured button. In either case, in block 370, the Web actions palette is filtered to remove one or more buttons no longer as relevant as other buttons in the palette. As well, in block 380 the Web actions palette is sorted to arrange the buttons of the palette in order of relevance. For instance, a button associated with the particular one of the social media Web sites associated with the suggestion may be arranged first in the palette. The particular social media Web site may be selected amongst multiple different social media Web sites in consideration of a nature of the relationship between the parties to the message, so that a professional social networking Web site is selected for a professional relationship, but a personal social networking Web site is selected for a personal relationship. As an example, if the text includes the phrase "Friend me" in a message between two personal friends, then the button associated with a personal social media Web site in which one may "friend" another is positioned first in the palette. Finally, in block 390 the Web actions palette is displayed in the mobile device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of dynamically configuring a Web actions palette, the method comprising:
   receiving a textual message from a message transmitter in a communications program of a message recipient, the program executing in memory of a computer;
   identifying in text of the textual message, words correlated to a suggestion to perform an action exposed by an application programming interface (API) of a social media Web site executing remotely from the computer, the action comprising establishing a connection within the social media Web site between the message recipient and a message transmitter of the textual message;
   generating a network request to perform the action in the Web site by combining a network reference to the social media Web site with a reference to a specific operation included in the API of the Web site comprising establishing a connection in the social media Web site between the message recipient and the message transmitter;
   configuring a button to transmit the generated network request and updating a palette of one or more buttons with the configured button for display in the computer;
   displaying the palette in the computer; and,
   repeating the loading, identifying, generating, configuring and displaying for additional messages received in the communications program.

2. The method of claim 1, wherein the network request is a uniform resource locator pointing to a page and invoking an action of a social media Web site.

3. The method of claim 1, further comprising filtering the palette to remove an existing button in response to the configuring of the button to transmit the generated network request.

4. The method of claim 1, further comprising sorting the palette to re-order buttons in the palette in response to the configuring of the button to transmit the generated network request.

5. The method of claim 1, wherein the palette is displayed in a newly composed message in the communications program.

6. The method of claim 1, wherein the Web site is a social media Web site and the action is an action to establish a connection in the social media Web site.

7. A data processing system configured for dynamically configuring a Web actions palette, the system comprising:
   a mobile computing device comprising memory and a processor;
   a communications program executing in the memory of the mobile computing device; and,
   a Web actions palette module executing in the memory of the mobile computing device, the module comprising program code enabled upon execution in the memory of the mobile computing device to receiving a textual message from a message transmitter in the communications program of a message recipient, identify in the text of the textual message, words correlated to a suggestion to perform an action exposed by an application programming interface (API) of a social media Web site executing remotely from the mobile computing device, the action comprising establishing a connection within the social media Web site between the message recipient and a message transmitter of the textual message, generate a network request to perform the action in the Web site by combining a network reference to the social media Web site with a reference to a specific operation included in the API of the Web site comprising establishing a connection in the social media Web site between the message recipient and the message transmitter, configure a button to transmit the generated network request and update a palette of one or more buttons with the configured button for display in the mobile computing device, display the palette in the mobile computing device, and repeat the loading, identifying, generating, configuring and displaying for additional messages received in the communications program.

8. The data processing system of claim 7, wherein the network request is a uniform resource locator pointing to a page and invoking an action of a social media Web site.

9. The data processing system of claim 7, wherein the program code is further enabled to filter the palette to remove an existing button in response to the configuring of the button to transmit the generated network request.

10. The data processing system of claim 7, wherein the program code is further enabled to sort the palette to re-order buttons in the palette in response to the configuring of the button to transmit the generated network request.

11. The data processing system of claim 7, wherein the palette is displayed in a newly composed message in the communications program.

12. The data processing system of claim 7, wherein the Web site is a social media Web site and the action is an action to establish a connection in the social media Web site.

13. A computer program product for dynamically configuring a Web actions palette, the computer program product comprising a non-transitory computer readable storage medium having program instructions embodied therewith, the program instructions executable by a device to cause the device to perform a method comprising:
   receiving a textual message from a message transmitter in a communications program of a message recipient, the program executing in memory of a computer;
   identifying in text of the textual message, words correlated to a suggestion to perform an action exposed by an application programming interface (API) of a social media Web site executing remotely from the computer, the action comprising establishing a connection within the social media Web site between the message recipient and a message transmitter of the textual message;

generating a network request to perform the action in the Web site by combining a network reference to the social media Web site with a reference to a specific operation included in the API of the Web site comprising establishing a connection in the social media Web site between the message recipient and the message transmitter;

configuring a button to transmit the generated network request and updating a palette of one or more buttons with the configured button for display in the computer;

displaying the palette in the computer; and, repeating the loading, identifying, generating, configuring and displaying for additional messages received in the communications program.

14. The computer program product of claim 13, wherein the network request is a uniform resource locator pointing to a page and invoking an action of a social media Web site.

15. The computer program product of claim 13, wherein the method further comprises filtering the palette to remove an existing button in response to the configuring of the button to transmit the generated network request.

16. The computer program product of claim 13, wherein the method further comprises sorting the palette to re-order buttons in the palette in response to the configuring of the button to transmit the generated network request.

17. The computer program product of claim 13, wherein the palette is displayed in a newly composed message in the communications program.

18. The computer program product of claim 13, wherein the Web site is a social media Web site and the action is an action to establish a connection in the social media Web site.

* * * * *